United States Patent
Merrill et al.

(10) Patent No.: US 10,308,284 B2
(45) Date of Patent: Jun. 4, 2019

(54) INDEXABLE SYSTEM FOR SELECT WHEEL ALIGNMENT CORRECTION

(71) Applicants: Compagnie Generale des Etablissements Michelin, Clermont-Ferrand (FR); Michelin Recherche et Technique S.A., Granges-Paccot (CH); Zachary Alexander Merrill, Greenville, SC (US); Matthew J. Hanlon, Greenville, SC (US)

(72) Inventors: Zachary Alexander Merrill, Greenville, SC (US); Matthew J. Hanlon, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 147 days.

(21) Appl. No.: 15/547,147

(22) PCT Filed: Mar. 10, 2015

(86) PCT No.: PCT/US2015/019633
§ 371 (c)(1),
(2) Date: Jul. 28, 2017

(87) PCT Pub. No.: WO2016/144328
PCT Pub. Date: Sep. 15, 2016

(65) Prior Publication Data
US 2018/0178842 A1    Jun. 28, 2018

(51) Int. Cl.
*B62D 17/00*    (2006.01)
*B60B 3/14*    (2006.01)
(Continued)

(52) U.S. Cl.
CPC .............. *B62D 17/00* (2013.01); *B60B 3/147* (2013.01); *B60B 3/165* (2013.01); *B60B 27/0015* (2013.01)

(58) Field of Classification Search
CPC ......... B62D 17/00; B60B 3/147; B60B 3/165; Y10T 29/49481; Y10T 29/49778;
(Continued)

(56) References Cited

U.S. PATENT DOCUMENTS 774,042 A    11/1904    Cooper
776,971 A    12/1904    Walsh
(Continued)

FOREIGN PATENT DOCUMENTS

FR    2965786 A1    4/2012
WO    WO2016/144328    9/1916
(Continued)

OTHER PUBLICATIONS

International Search Report dated Jun. 11, 2015 for International Application No. PCT/US2015/019633.
(Continued)

*Primary Examiner* — Jason L Vaughan
*Assistant Examiner* — Amanda Kreiling
(74) *Attorney, Agent, or Firm* — Dority & Manning, P.A.

(57) ABSTRACT

A system for wheel alignment is provided including adjustments to camber, toe, and thrust. A sleeve is fitted over the spindle of an axle. Rotation of the sleeve relative to the spindle provides for adjustments to wheel alignment while a locking feature such as e.g., a pin, is used to maintain the selected position of the sleeve relative to the spindle. The available positions of the sleeve Crelative to the spindle are predetermined in order to provide for discrete, known
(Continued)

adjustments to the alignment of the wheel. Numerous positions can be provided based on the range and magnitude of adjustability selected.

19 Claims, 11 Drawing Sheets

(51) Int. Cl.
  *B60B 3/16* (2006.01)
  *B60B 27/00* (2006.01)
(58) Field of Classification Search
  CPC ......... Y10T 29/49895; Y10T 29/49899; Y10T 29/49901; Y10T 29/49902; Y10T 29/53913; Y10T 29/54
  See application file for complete search history.

(56) References Cited

U.S. PATENT DOCUMENTS

| | | | |
|---|---|---|---|
| 2,923,555 A | 2/1960 | Kost |
| 3,520,377 A | 7/1970 | Wallace |
| 4,037,680 A | 7/1977 | Grove |
| 4,195,862 A | 4/1980 | Specktor |
| 4,252,338 A | 2/1981 | Ingalls |
| 4,400,007 A | 8/1983 | Ingalls |
| 4,420,272 A | 12/1983 | Ingalls |
| 4,541,162 A | 9/1985 | Halvin |
| 4,641,853 A | 2/1987 | Specktor |
| 4,684,150 A | 8/1987 | Specktor |
| 4,921,271 A | 5/1990 | Berry |
| 4,970,801 A | 11/1990 | Specktor |
| 5,044,659 A | 9/1991 | Specktor |
| 5,048,979 A | 9/1991 | Coates |
| 5,060,962 A | 10/1991 | McWethy |
| 5,110,151 A | 5/1992 | Blechschmidt |
| 5,201,898 A | 4/1993 | Pierce |
| 5,259,676 A | 11/1993 | Marti |
| 5,383,678 A | 1/1995 | Sokol |
| 5,622,378 A | 4/1997 | Schlosser |
| RE36,058 E | 1/1999 | Sokol |
| 5,918,707 A | 7/1999 | Saunders, III |
| 6,036,205 A | 3/2000 | Schlosser |
| 6,374,665 B1 | 4/2002 | Somppi |
| 6,431,659 B1 | 8/2002 | Somppi |
| 6,474,873 B1 | 11/2002 | Krisher |
| 6,557,872 B1 | 5/2003 | Gerrard |
| 6,705,626 B2 | 3/2004 | Chevillard |
| 7,210,693 B2 | 5/2007 | Ingalls |
| 8,464,611 B1 | 6/2013 | Chandler |
| 8,918,974 B2 | 12/2014 | Merrill |
| 10,106,195 B2 | 10/2018 | Merrill |
| 10,124,829 B2 | 11/2018 | Merrill |
| 2004/0178595 A1 | 9/2004 | Coggin |
| 2005/0280229 A1 | 12/2005 | Ingalls |
| 2007/0052282 A1 | 3/2007 | White |
| 2007/0096418 A1 | 5/2007 | Houser |
| 2008/0024003 A1 | 1/2008 | White |
| 2011/0239430 A1 | 10/2011 | Merrill |
| 2011/0291468 A1* | 12/2011 | Rieger ................ B60B 27/0005 301/105.1 |
| 2017/0080760 A1 | 3/2017 | Foor |
| 2017/0120674 A1 | 5/2017 | White |
| 2017/0240206 A1 | 8/2017 | Merrill |
| 2017/0247055 A1 | 8/2017 | Merrill |
| 2018/0009478 A1 | 1/2018 | Merrill |
| 2018/0009479 A1 | 1/2018 | Merrill |
| 2018/0178842 A1 | 6/2018 | Merrill |

FOREIGN PATENT DOCUMENTS

| | | |
|---|---|---|
| WO | WO2016/144330 | 9/1916 |
| WO | WO 1998/32639 | 7/1998 |
| WO | WO 2001/74647 | 10/2001 |
| WO | WO 2013/104427 A1 | 7/2013 |

OTHER PUBLICATIONS

International Search Report dated Jun. 10, 2015 for International Application No. PCT/US2015/019647.

International Search Report dated Jun. 29, 2015 for International Application No. PCT/US2015/019662.

Extended European Search Report for PCT/US2015/019633 dated Oct. 9, 2018.

Extended European Search Report for PCT/US2015/019647 dated Oct. 9, 2018.

Extended European Search Report for PCT/US2015/019662 dated Oct. 9, 2018.

* cited by examiner

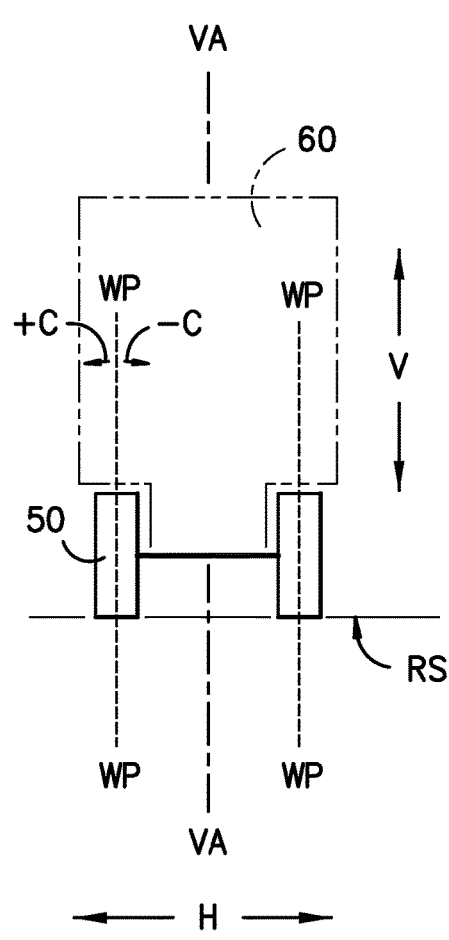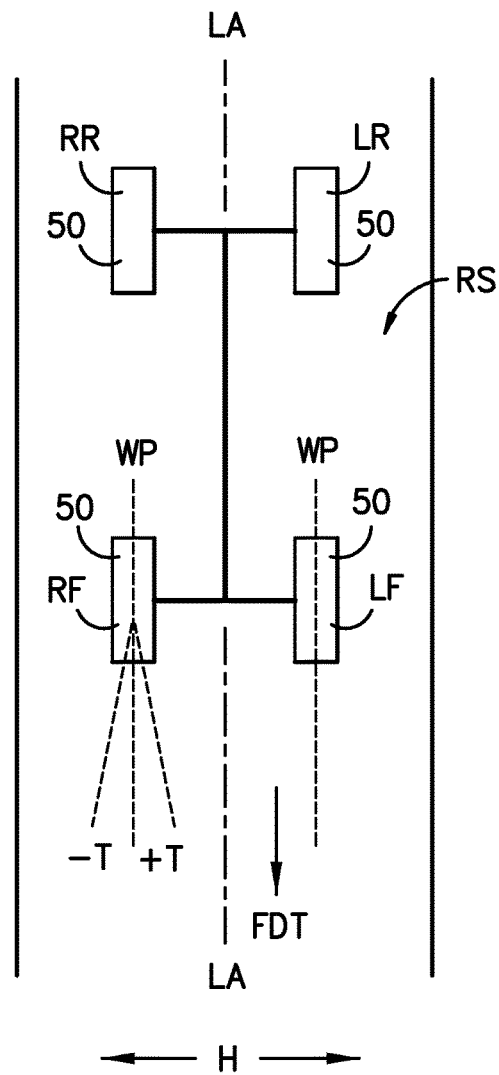
FIG. -1-
FIG. -2-

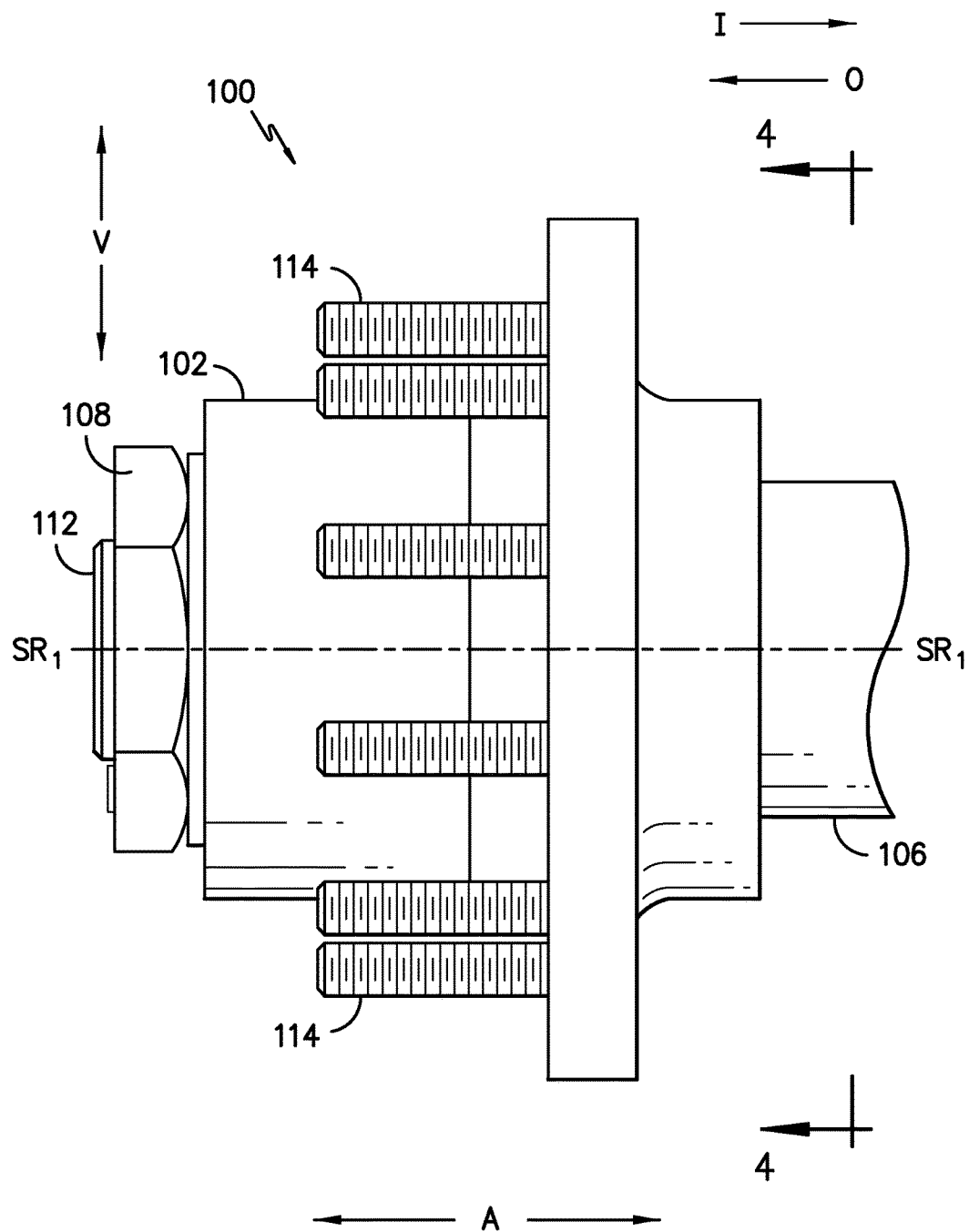
FIG. -3-

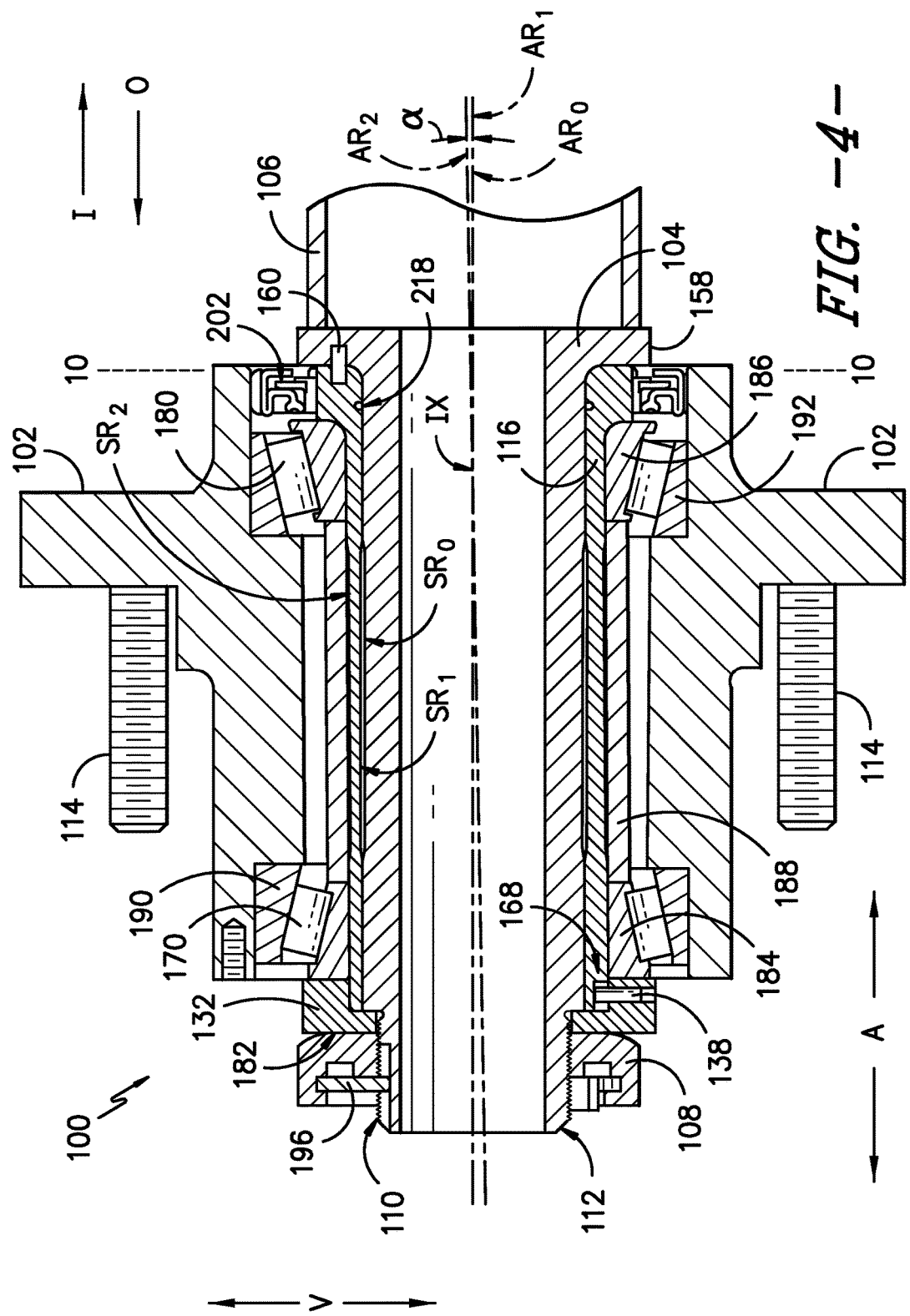
FIG. -4-

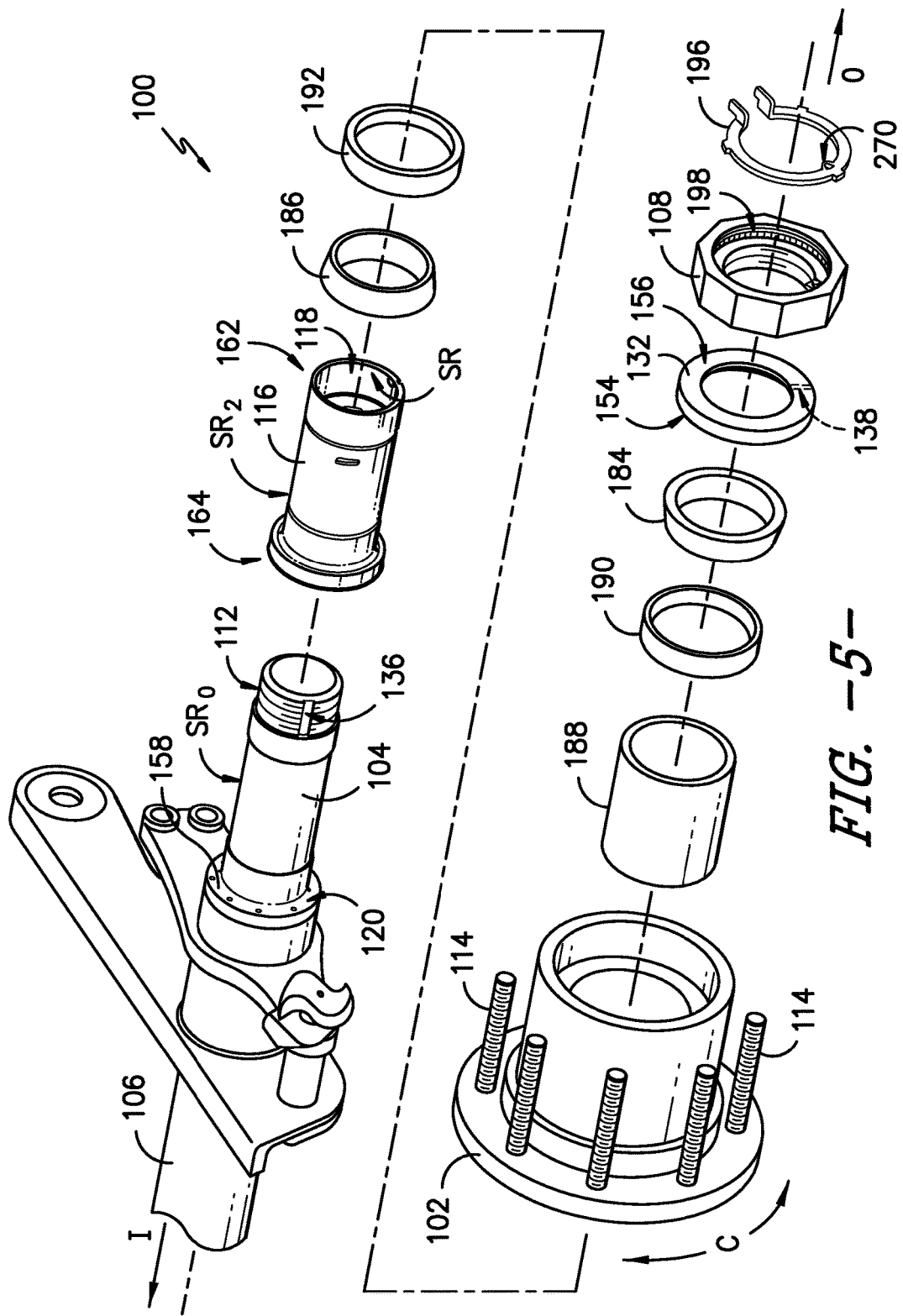
FIG. -5-

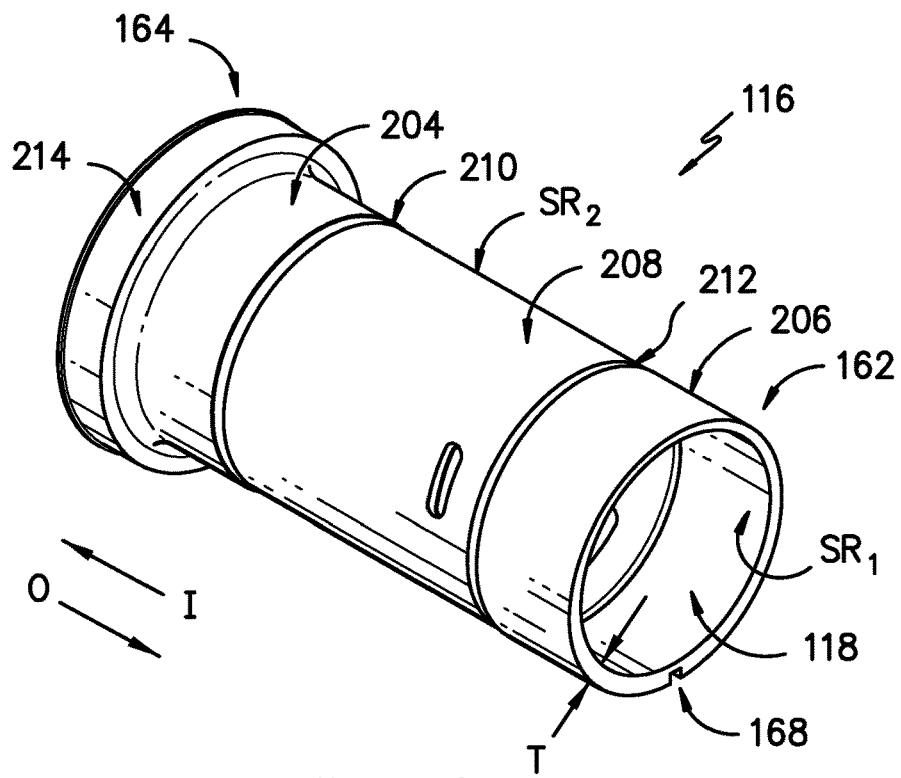
FIG. -6-
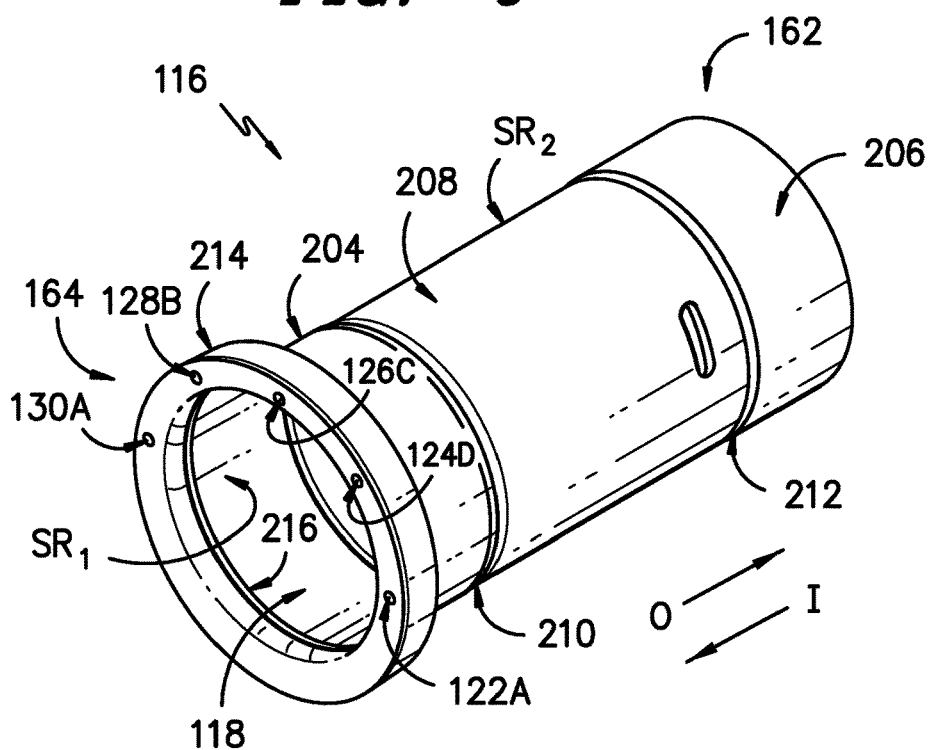
FIG. -7-

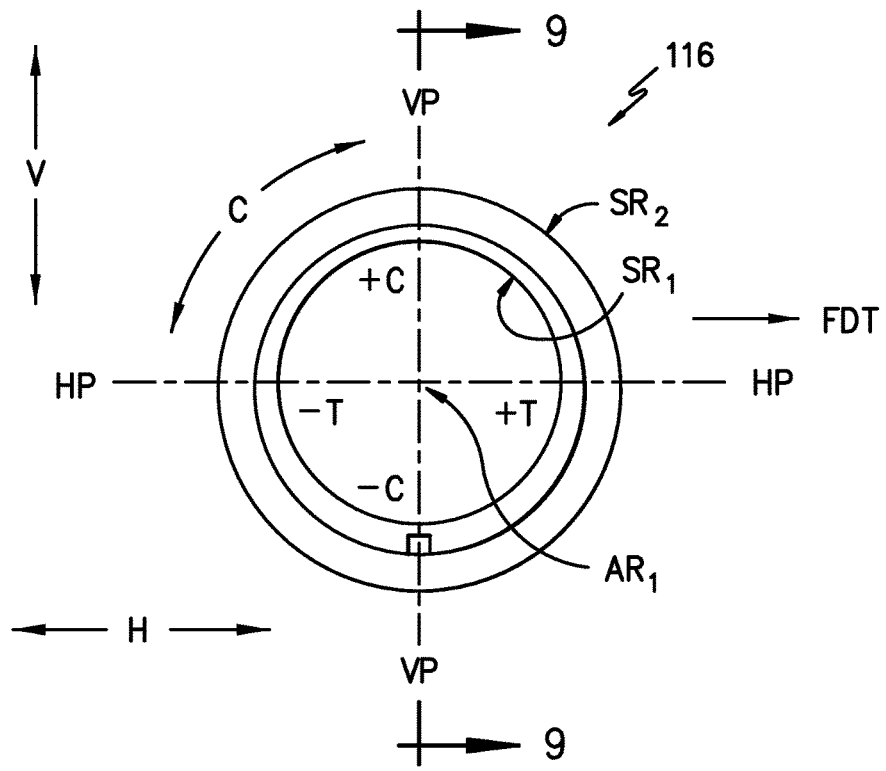
FIG. -8-
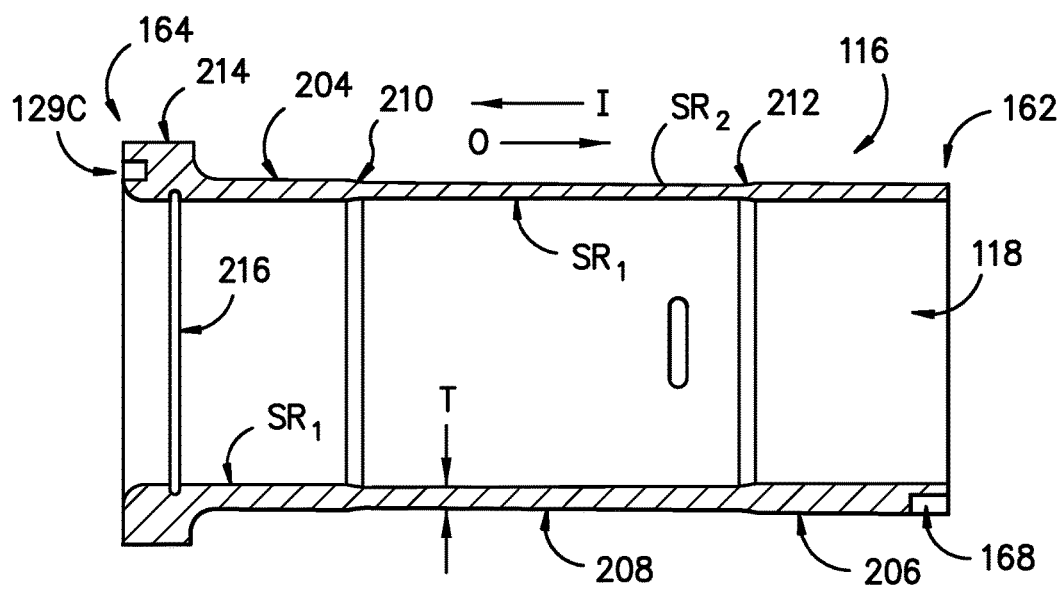
FIG. -9-

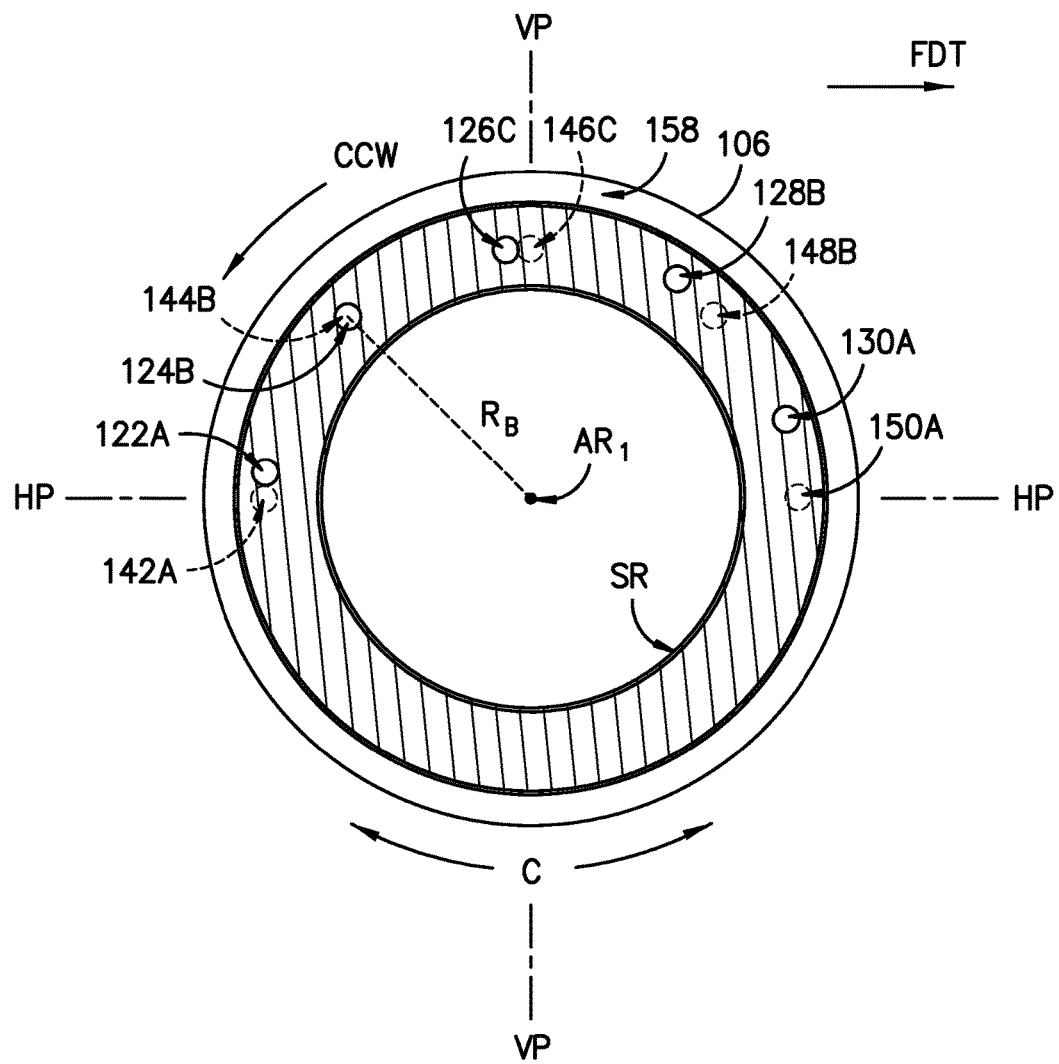
FIG. -10-

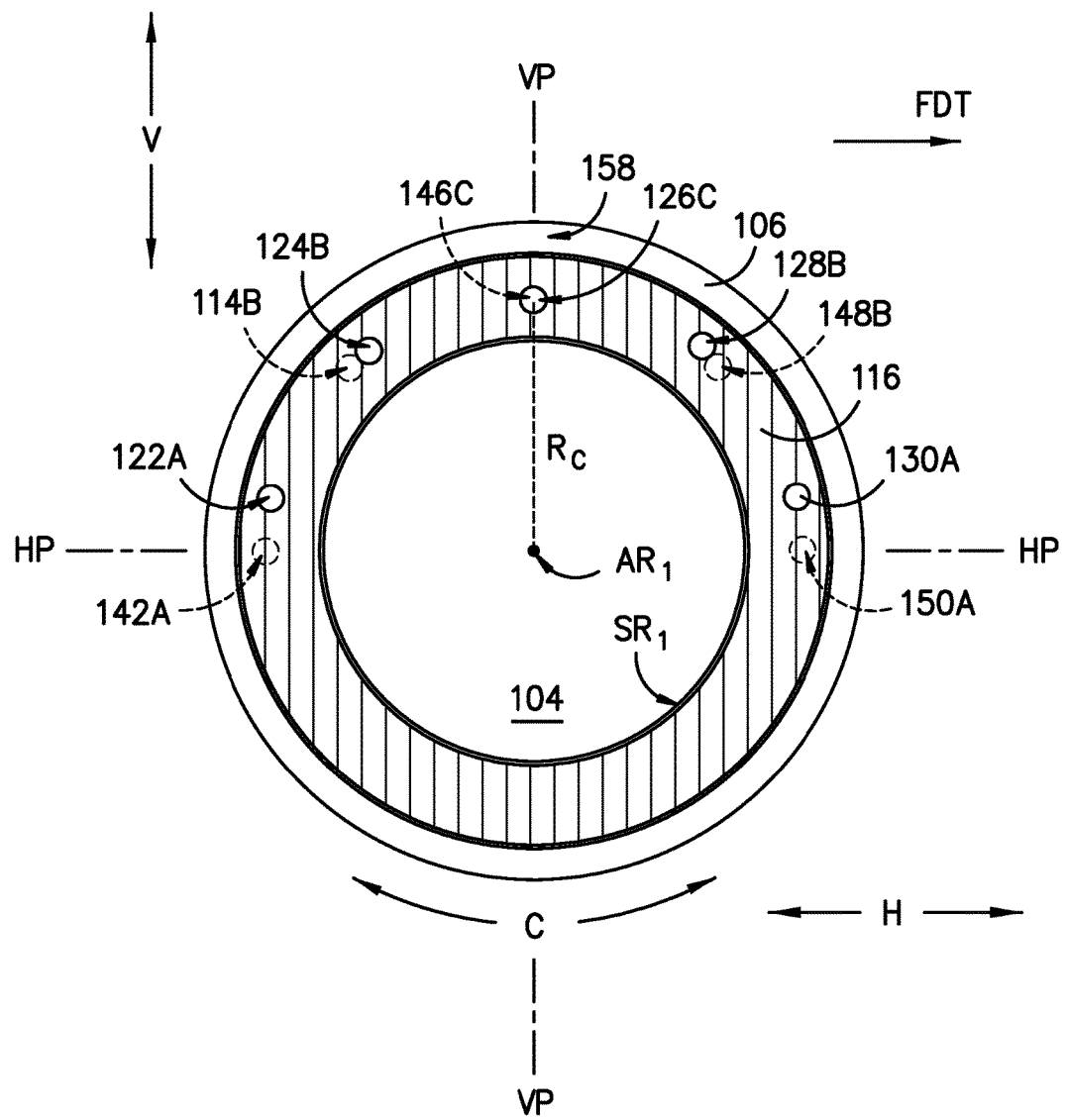
FIG. -11-

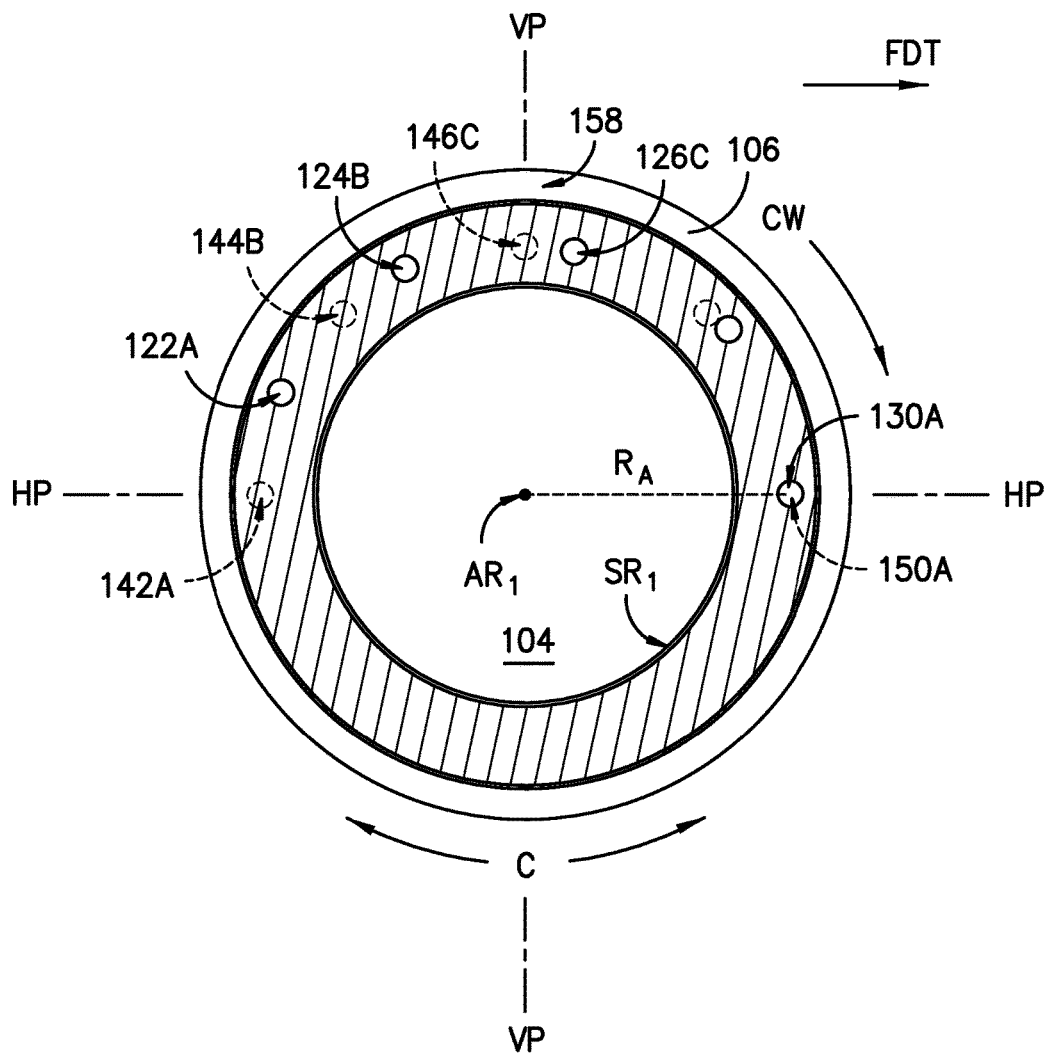
FIG. -12-

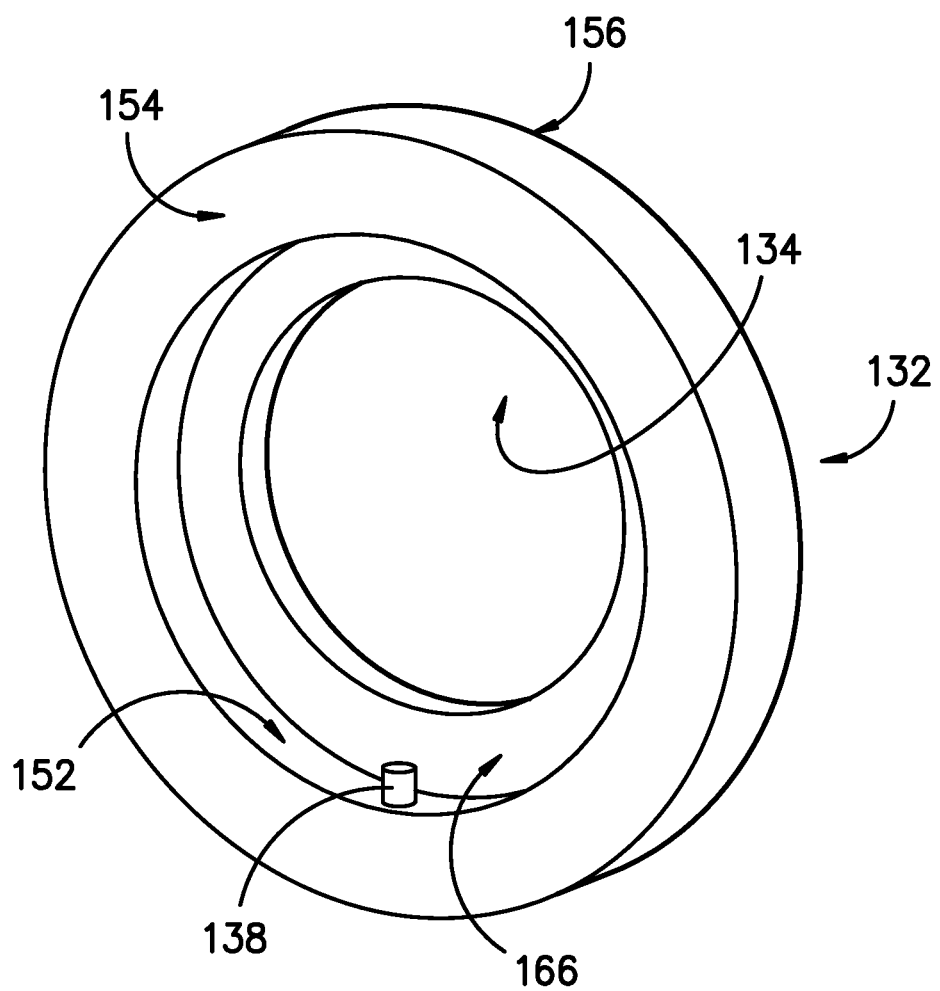
FIG. -13-

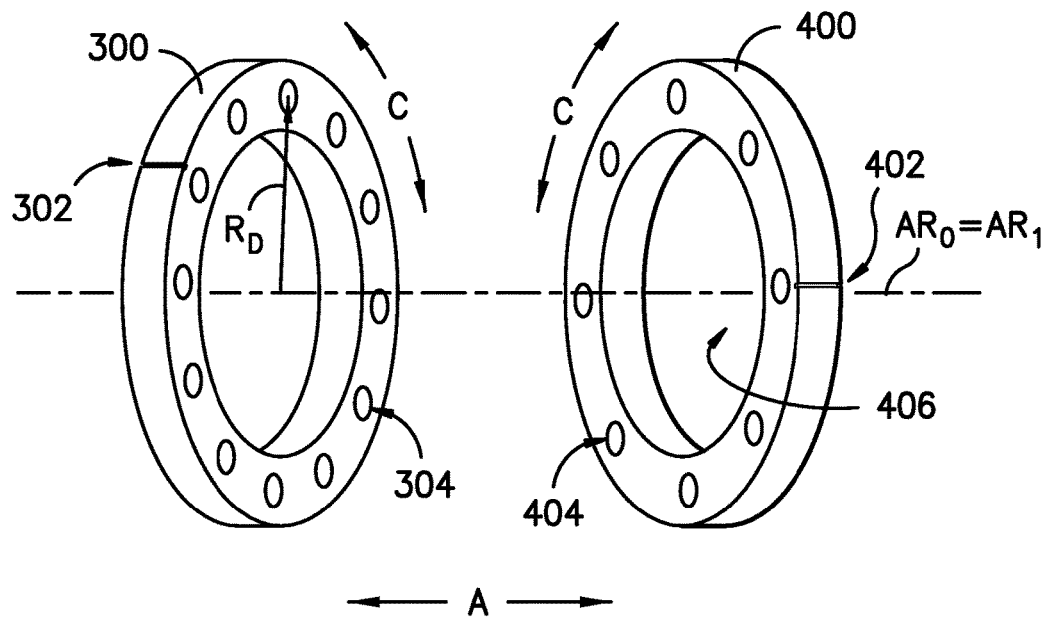
FIG. -14-
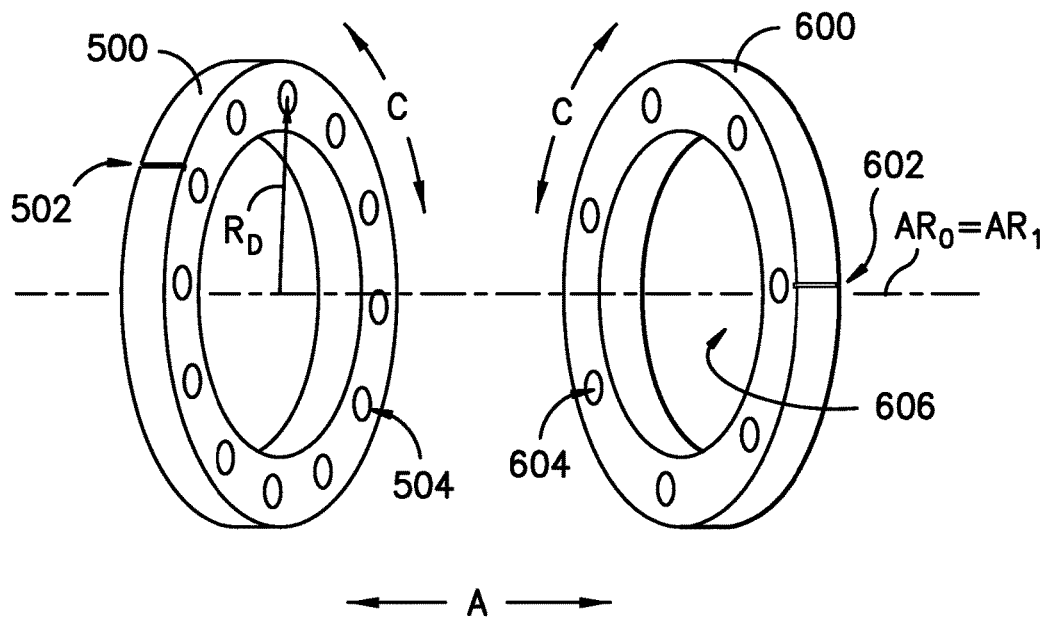
FIG. -15-

INDEXABLE SYSTEM FOR SELECT WHEEL ALIGNMENT CORRECTION

FIELD OF THE INVENTION

The subject matter of the present disclosure relates generally to a system for correcting the alignment of a wheel mounted onto a hub and axle assembly.

BACKGROUND OF THE INVENTION

The alignment of a vehicle's wheel plane WP relative to the path traveled by the vehicle affects not only the handling of the vehicle but also affects the wear on the tires. As used here, alignment refers to camber, toe, and thrust. Referring to FIG. 1, camber is the angle between the wheel plane WP and a vertical axis VA of the vehicle 60. Positive camber (+C) refers to an angle where the top of the wheel 50 is farther away from the center of vehicle 60 than the bottom of the wheel 50. Negative camber (−C) refers to an angle where the bottom of the wheel 50 is farther away from center of the vehicle 60 than the top. Generally speaking, camber changes of even a fourth of one degree can impact tire wear. Abnormal tire wear has been observed in certain applications with even smaller changes in camber angle. Free rolling (non-driven) tires in low wear rate applications are especially sensitive to camber and thus particularly prone to developing abnormal wear if the camber angle is unfavorable.

Referring to FIG. 2, toe is the angle the wheel plane WP makes with a centerline along the longitudinal axis LA of the vehicle 60. Positive toe (+T), also referred to as toe in, is a condition where the front of the wheel 50 or the wheel plane WP is pointing in or towards the center line of the vehicle 60. Negative toe (−T), also referred to as toe out, is a condition where the front of the wheel 50 or wheel plane WP points out or away from the center line of the vehicle 60. Thrust is the resulting direction of travel (FDT) of an axle as opposed to the direction that might be expected from the orientation of wheel planes WP of the wheels on the axle. Generally speaking, toe changes of even one-tenth of a degree can have an impact on tire wear.

The typical trailer axle is made by welding a pair of spindle forgings onto a piece of axle tubing then machining the precision surfaces of both spindles simultaneously in a lathe process. The resulting axle is near perfectly straight—i.e., each spindle axis possesses zero camber and zero toe. When a typical axle is installed under a vehicle (used herein to refer to both motorized vehicles as well as trailers) and placed into normal operation under typical loading conditions, the camber does not remain at zero. The axle under load, although quite rigid, flexes. The flexing of the axle occurs because the suspension is attached to the axle at load transfer points which are significantly inboard of the ends of the axle, but the tires support the weight of the vehicle by means of attachment points which are relatively near the outboard ends of the axle. As a result of this geometry, the weight of the vehicle imposes a bending moment on the axle which in turn causes upward deflection of the ends of the axle resulting in the tires presenting a slight negative camber. As the load increases, the more negative the camber becomes. At the typical maximum legal tandem axle load in the United States, it would not be unusual for the wheel camber angle to reach approximately 0.5 degrees. The contribution of tire alignment to tire wear can be particularly problematic with vehicles used for transporting heavy loads.

Once the weight is removed, the axle may recover and again affect the alignment of the wheels. Because of factors such as the additional costs and amount of material that would be required, increasing the stiffness of the axle to resolve camber issues may not be practical.

Even with the same amount of camber on each axle spindle, axle camber affects the tires differently depending on their individual wheel end position on the vehicle because most road surfaces (RS) are not flat transversely (orthogonal to the normal travel direction) across the road. The road surface is either crowned or sloped (by about 1.5% on average) so that water will evacuate from the road surface. Trucks, in North America and other countries using the right side of the road for forward traffic, generally operate in the right most lane, which is usually sloped very slightly to the right. This means that as vehicle is traveling on the road way, there is a gravitational force pulling the vehicle to the right. This force is resisted through the tire contact patch, and the tire transmits this force to the axle by transmitting the required force opposite of the direction of pull through its interface with its wheel. The result is that as the tire rolls down the highway, the contact patch shifts leftward with respect to the wheel plane WP. At full load and at normal pressure on a typical New Generation Wide Base Single tire (NGWBS tire), this shift has an effect on tire shoulder wear that is roughly the equivalent of a 0.2 degree shift in wheel camber. This means that, although the left and the right wheel may each measure approximately −0.5 degree of camber, when the shift effect is considered, the effective camber angle on the left side tires is approximately −0.7 degree, and the effective camber angle on the right side tires is approximately −0.3 degree. As a consequence of this phenomenon, tires on the driver side left of the vehicle usually experience worse inboard shoulder wear than tires on the driver side right of the vehicle.

When a typical tandem axle vehicle (tractor or trailer) turns, the dynamics of the vehicle favor lateral grip by the forward axle tires. As a result, the pivot point of the vehicle shifts toward the forward axle tires, and the rear axle tires will tend to have greater slip laterally as the vehicle negotiates a turn. For this reason, the rear tires on a tandem axle pair receive more scrub and have a faster wear rate than the tires on the forward axle. Scrub tends to arrest the development of irregular wear and thus the rear tires usually are less affected by the camber issue than are the tires on the forward axle.

As a consequence, irregular tire wear is usually worst on the inboard surface of the LF tire. Next worst is the LR tire. The RF tire comes next but is sometimes similar in severity to the LR. The most even wear usually is found on the RR tire depending upon the particular application, load, and routes normally traveled. It should be obvious that in countries such as Australia, where drivers drive on the left side of the road instead of the right side, such observations would be reversed.

Therefore, a need exists for improved methods and apparatus for adjusting or correcting axle alignment and, more particularly, for allowing adjustment to camber, toe, and thrust. A system that allows for select adjustments—i.e. adjustments by discrete, predetermined amounts would be useful. Such a system that allows for a wide range in variation of adjustment and for the indexing of such adjustments would also be useful. Additional usefulness would be provided by a system that allows for adjustment of the alignment of an axle using hardware that can be used for the left or right sides of the vehicle.

SUMMARY OF THE INVENTION

The present invention provides a system for wheel alignment. A sleeve is fitted over the spindle of an axle. Rotation of the sleeve relative to the spindle provides for adjustments to wheel alignment while a locking feature such as e.g., a pin, is used to maintain the selected position of the sleeve relative to the spindle. The available positions of the sleeve relative to the spindle are predetermined in order to provide for discrete, known adjustments to the alignment of the wheel. Numerous positions can be provided based on the range and magnitude of adjustability selected. Additional objects and advantages of the invention will be set forth in part in the following description, or may be apparent from the description, or may be learned through practice of the invention.

In one exemplary aspect, the present invention provides a method for indexing a wheel alignment system for a vehicle, the wheel alignment system including an axle defining axial, radial, and circumferential directions. The axle includes a flange and a spindle onto which a sleeve is rotatably received. The axle has an outer surface of revolution about an axis $AR_O$. The method includes the steps of choosing a total number $FP_{TOT}$ of a first plurality of axially-oriented apertures for positioning on the sleeve; positioning the first plurality of apertures on the sleeve at locations uniformly apart from each other along the circumferential direction with each at a predetermined radial distance from axis $AR_O$; selecting a total number $SP_{TOT}$ of a second plurality of axially-oriented apertures for positioning on the flange; wherein $SP_{TOT}$ and $FP_{TOT}$ do not share any common factors other than integer 1; and positioning the second plurality of apertures on the flange at locations uniformly apart from each other along the circumferential direction and at the predetermined radial distance from axis $AR_O$. The first and second plurality of apertures provide a plurality of matching pairs of apertures that can be aligned along the axial direction by rotation of the sleeve to provide changes in wheel alignment.

In another exemplary aspect, the present invention provides an assembly allowing selective adjustment of wheel alignment on a vehicle. The assembly includes an axle defining axial, radial, and circumferential directions. The axle includes a flange and a spindle having an outboard end and an inboard end.

A first plurality of apertures are positioned at an inboard end of the sleeve and extend along the axial direction. The first plurality of apertures are spaced apart along the circumferential direction and at varying radial distances from the first axis. The total number of the first plurality of apertures is $FP_{TOT}$.

A second plurality of apertures are positioned on the flange near an inboard end of the spindle and extend along an axial direction. The second plurality of apertures are spaced apart along the circumferential direction and at positioned at varying radial distances from the first axis. The total number of the first plurality of apertures is $SP_{TOT}$. $SP_{TOT}$ and $FP_{TOT}$ do not share any common factors other than integer 1. The first and second plurality of apertures provide a plurality of matching pairs of apertures that can be aligned along the axial direction by rotation of the sleeve to provide changes in wheel alignment.

A removable lock extends between the apertures of one of the matching pairs of apertures so as to prevent the rotation of the sleeve relative to the spindle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a front view of an exemplary vehicle having wheels as may benefit from use of the present invention.

FIG. 2 illustrates a top view of the exemplary vehicle of FIG. 1.

FIG. 3 illustrates a view (top, bottom, or side) of an exemplary assembly of the present invention as may be used for correction of toe, camber, and/or thrust.

FIG. 4 illustrates a cross-sectional view along line 4-4 of the exemplary assembly of FIG. 3.

FIG. 5 provides an exploded perspective view of the exemplary assembly of FIG. 3.

FIG. 6 provides a perspective view of an outboard end of an exemplary sleeve of the present invention.

FIG. 7 provides a perspective view of an inboard end of the exemplary sleeve of FIG. 6.

FIG. 8 provides an end view, from the outboard side, of the exemplary sleeve of FIG. 6.

FIG. 9 is a cross-sectional view of the exemplary sleeve taken along the longitudinal axis of the sleeve.

FIGS. 10, 11, and 12 are partial cross-sectional views, along line 10-10 of FIG. 4, of an exemplary sleeve and flange. Different circumferential positions of the sleeve relative to the flange are depicted in each figure as more fully described herein.

FIG. 13 is a perspective view of an inboard side of an exemplary washer of the present invention.

FIGS. 14 and 15 provide perspective views of an exemplary flange and the inboard end of an exemplary sleeve of the present invention.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

For this disclosure, the following terms are defined as follows:

"Axial direction," or the letter "A" without a subscript in the figures, refers to a direction parallel to the axis of rotation of, for example, the hub or the wheel as it travels along a road surface. As used in the figures herein, the vertical direction V is orthogonal to the axial direction and the horizontal direction H is parallel to the axial direction A.

"Radial direction" or the letter "R" in the figures refers to a direction that is orthogonal to the axial direction and extends in the same direction as any radius that extends orthogonally from the axial direction.

"Inboard" refers to a direction along axial direction A that is towards the vehicle and is designated with the letter I.

"Outboard" refers to a direction along axial direction A that is away from the vehicle and is designated with the letter O.

"Surface of revolution" or the letters AR is the surface in Euclidean space that is formed by rotating a curve or line around a straight line (referred to herein as the axis) in its plane.

"Wheel plane" or the letters "WP" is a plane passing down the center of the wheel (including the tire) and dividing the wheel into two equal, circular portions.

"Toe" or the letter "T" means the angle of the wheel plane WP with respect to a longitudinal axis along the center of the vehicle.

"Camber" or the letter "C" means the angle of the wheel plane WP with respect to the vertical axis VA of the vehicle. As used herein, when the wheel plane is parallel to the vertical direction and orthogonal to the axial direction, both camber and toe are considered to be at zero—i.e. in a position of no camber or toe correction of the wheel alignment.

"Vehicle" includes motorized vehicles and non-motorized vehicles including trailers.

"Factor" refers to numbers multiplied together to obtain another number.

"Greatest common factor" or GCF of two numbers means the integer that is the greatest factor which can divide the two numbers.

FIGS. 3, 4, and 5 illustrate an exemplary assembly 100 of the present invention as may be used to make adjustments to camber, toe, and thrust by adjusting the alignment of the axis of rotation of a hub 102 relative to a spindle 104 positioned at the end of an axle 106. Hub 102 is retained onto axle 106 by an axle nut 108 (also referred to as a spindle nut) that engages complementary threads 110 on threaded end 112 of spindle 104. A clip 196 is received into teeth 198 (FIG. 5) of axle nut 108. Clip 196 includes a tab 270 received into groove 136 to prevent nut 109 from turning once tightened onto spindle 104. Hub 102 is rotatable about spindle 104.

A plurality of threaded lugs 114 may be used with complementary fasteners for securing a wheel or wheel rim onto assembly 100. Wheel assembly 100 may be used on a heavy commercial vehicle such as a trailer or other vehicle types as well. Hub 102 and axle nut 108 are provided by way of example—other hub types and mechanisms of attachment to axle 106 may also be used.

As shown in the cross-sectional view of FIG. 4 and in FIG. 5, spindle 104 has an outer surface of revolution $SR_0$ about a spindle axis $AR_0$ that is located at the center of spindle 104. For this exemplary embodiment, assembly 100 includes a cylindrically-shaped sleeve 116 that is machined with an internal diameter such that spindle 104 can be received within the interior 118 of sleeve 116 and onto outer surface $SR_0$.

As shown in FIGS. 4, and 6 through 9, sleeve 116 has an inner surface of revolution $SR_1$ about a first axis $AR_1$. When spindle 104 is matingly received within the interior 118 of spindle sleeve 116 as shown in FIG. 4, spindle axis $AR_0$ and first axis $AR_1$ are coincident with other or i.e. geometrically the same. As also shown, spindle sleeve 116 has an outer surface of revolution $SR_2$ about a second axis $AR_2$ that forms a predetermined angle $\alpha$ relative first axis $AR_1$. Different sleeves 116 can be manufactured with different predetermined values for angle $\alpha$. In one exemplary embodiment, angle $\alpha$ has degree value that is within the range of $0.1° \leq \alpha \leq 0.7°$. In still another exemplary embodiment, angle $\alpha$ has value of $0.3°$. Other values may be used as well.

The cross-section of FIG. 4 is selected for purposes of illustrating the maximum value of angle $\alpha$. It should be appreciated that in a cross-sectional view that is orthogonal to the view shown in FIG. 5, it would appear that the value of angle $\alpha$ is zero. Thus, as used herein, angle $\alpha$ refers to the angle value as measured within a plane containing (i.e. coplanar with) first axis $AR_1$ and second axis $AR_2$. Additionally, as used herein, angle $\alpha$ also refers to the absolute value of the angle between first axis $AR_1$ and second axis $AR_2$ on the inboard side of the intersection IX of these two axes as depicted in FIG. 4.

The present invention allows the circumferential position (i.e. the location along circumferential direction C) of angle $\alpha$ about first axis $AR_1$ to be selectively determined in order to make changes in toe, camber, and thrust for a wheel mounted on hub 102. Such adjustment is accomplished by rotations of sleeve 116 to achieve the desired circumferential orientation of sleeve 116 relative to axle 106 as will be further described.

For example, referring specifically to FIG. 8 (a view of sleeve 116 from an outboard end), by locating axes $AR_1$ and $AR_2$ both within a vertical plane VP (a plane parallel to vertical direction V), positive or negative changes in camber can be accomplished. Positive camber can be created by positioning second axis $AR_2$ and angle $\alpha$ above first axis $AR_1$ within vertical plane VP as indicated by +C. Negative camber can be created by positioning second axis $AR_2$ and angle $\alpha$ below first axis $AR_1$ within vertical plane VP as indicated by −C.

Similarly, by locating axes $AR_1$ and $AR_2$ both within a horizontal plane HP (a plane parallel to horizontal direction H), positive or negative changes in toe can be accomplished. Positive toe can be created by positioning second axis $AR_2$ and angle $\alpha$ in front of first axis $AR_1$ (front being relative to the forward direction of vehicle travel or FDT as shown in FIG. 2) within horizontal plane HP as indicated by +T. Negative toe can be created by positioning second axis $AR_2$ and angle $\alpha$ behind first axis $AR_1$ relative to the forward direction of vehicle travel FDT within horizontal plane HP as indicated by −T.

Changes in both camber and toe can be effected by combinations where axes $AR_1$ and $AR_2$ (and angle $\alpha$) are at locations between horizontal plane HP and vertical plane VP. Accordingly, positive or negative changes in camber, positive or negative changes in toe, as well as adjustments to thrust can be accomplished simultaneously depending upon the circumferential orientation of sleeve 116 relative to spindle 104. The value of predetermined angle $\alpha$ as well as its circumferential location (i.e. the location of sleeve outer surface axis $AR_2$ relative to horizontal plane HP, vertical plane VP, and forward direction of travel FDT) will control the amount of camber, toe, and thrust adjustment that occurs using sleeve 116.

As now described, certain features are provided to fix the circumferential position of sleeve 116 during use so that e.g., rotational torque from rotation of a wheel on hub 102 does not change sleeve 116's circumferential orientation once set. At the same time, such features allow the circumferential position of sleeve 116 to be readily adjusted.

FIGS. 10, 11, and 12 provide partial cross-sectional views, along line 10-10 of FIG. 4, of sleeve 116 (shown in cross-section), spindle 104, and a flange 158 of axle 106. Different circumferential positions of the sleeve 116 relative to flange 158 are depicted in each figure as will be further described. In this exemplary embodiment, sleeve 116 includes a first plurality of apertures 122A, 124B, 126C, 128B, and 130A. Flange 158 includes a second plurality of apertures 142A, 144B, 146C, 148B, and 150A (shown in dashed circles to indicate their position behind sleeve 116 in this end view).

The letters A, B, and C used with each aperture number denote apertures that are located at the same radial distance from first axis $AR_1$. More particularly, as shown in FIG. 10, apertures 124B and 144B are positioned at the same radial distance—denoted with $R_B$—from first axis $AR_1$. As shown in FIG. 12, apertures 130A and 150A are positioned at the same radial distance—denoted with $R_A$—from first axis $AR_1$.

Referring to FIG. 11, central aperture 126C and central aperture 146C are positioned at the same radial distance—denoted with $R_C$—from first axis $AR_1$. For this embodiment, apertures 126C and 146C are also centrally located in that the positioning of all other apertures is symmetrical about a vertical plane VP passing through the middle of central apertures 126C and 146C. In other embodiments of the invention, a different number of apertures may be used including both odd and even amounts.

Used together, the first and second plurality of apertures provide a plurality of matching pairs of apertures that can be aligned along the axial direction by rotation of sleeve 116. For this exemplary embodiment, such matching pairs include:

122A and 142A;
124B and 144B;
126C and 146C;
128B and 148B; and
130A and 150A.

Each such matching pair can be aligned along the axial direction to provide a discrete, predetermined amount of correction to the wheel alignment. A removable lock—in this exemplary embodiment a pin 160 (FIG. 3)—extends between the apertures of the matching pairs to fix the circumferential position of sleeve 116 relative to spindle 104 once the desired circumferential position is selected.

By way of example, FIG. 11 depicts a central circumferential position for sleeve 116 relative to spindle 104 where the matching pair of central apertures 126C, 146C are aligned along the axial direction. Pin 160 (see FIG. 4) is inserted through each aperture 126C and 146C to fix the position of sleeve 116 relative to spindle 104 and thereby prevent sleeve 116 from freely rotating about spindle 104. For this exemplary embodiment of assembly 100, the position in FIG. 11 aligns wheel plane WP with a predetermined amount of positive camber only and a zero amount of toe because angle α (always referenced herein with respect to its value and location on the inboard side of intersection IX in FIG. 4) is above the horizontal plane HP and positioned wholly within the vertical plane VP (see above discussion regarding FIG. 8). The amount of camber in this position depends upon the magnitude of angle α.

FIG. 10 depicts a circumferential position for sleeve 116 relative to spindle 104 where matching pair of apertures 124B, 144B are aligned along the axial direction. Starting from a position as shown in FIG. 11, sleeve 116 is rotated counter clockwise (CCW) to obtain the position shown in FIG. 10. Pin 160 is inserted through each aperture 124B and 144B (FIG. 4) to fix the position of sleeve 116 relative to spindle 104 and thereby prevent sleeve 116 from freely rotating about spindle 104. For this exemplary embodiment of assembly 100, the circumferential position in FIG. 10 orients wheel plane WP with a predetermined amount of positive camber and negative toe because angle α is above the horizontal plane HP and behind the vertical plane VP (see above discussion regarding FIG. 8). The amount of camber and toe in this position depends upon the magnitude of angle α and the amount by which sleeve 116 must be rotated from the circumferential position shown in FIG. 11 to the circumferential position shown in FIG. 10 so as to align apertures 124B and 144B. In turn, the amount of such rotation is controlled by the number of apertures and the amount of spacing along the circumferential direction C between such apertures. Stated differently, the amount of such rotation depends on the distance along circumferential direction C between apertures 124B and 144B from the central apertures 126C and 146C, respectively. For example, angle α and the circumferential spacing between apertures C could be such that rotation from the position shown in FIG. 11 to the position shown in FIG. 10 provides a 0.05 degree change in toe.

Similarly, FIG. 12 depicts a circumferential position for sleeve 116 relative to spindle 104 where matching pair of apertures 130A, 150A are aligned along the axial direction. Starting from a position as shown in FIG. 11, sleeve 116 is rotated clockwise (CW) to obtain the position shown in FIG. 12. Pin 160 is inserted through each aperture 130A and 150A (FIG. 4) to fix the position of sleeve 116 relative to spindle 104 and thereby prevent sleeve 116 from freely rotating about spindle 104. For this exemplary embodiment of assembly 100, the circumferential position in FIG. 12 orients wheel plane WP with a predetermined amount of positive camber and positive toe because angle α is above the horizontal plane HP and in front of the vertical plane VP (see above discussion regarding FIG. 8). The amount of camber and toe in this position depends upon the magnitude of angle α and the amount by which sleeve 116 must be rotated from the circumferential position shown in FIG. 11 to the circumferential position shown in FIG. 12. In turn, the amount of such rotation is controlled by the number of apertures and the amount of spacing along the circumferential direction C between such apertures. For example, angle α and the circumferential spacing between apertures C could be such that rotation from the position shown in FIG. 11 to the position shown in FIG. 11 provides a 0.15 degree change in toe.

Returning to FIG. 4, the intersection IX of axis $AR_1$ and axis $AR_2$, can be chosen so as to maintain alignment of any brake friction surfaces, such as brake pads against a disc, or a brake shoes against a brake drum, such that the brake friction surfaces remain as close to the same alignment as was originally intended prior to the camber, toe and or thrust angle adjustment of the spindle sleeve 116. In some exemplary embodiments of assembly 100, intersection point IX is chosen by positioning axes $AR_1$ and $AR_2$ such that intersection IX is located between the brake friction surfaces thereby minimizing brake component offset.

The magnitude of predetermined angle α is used to control the amount of wheel alignment that can be achieved through rotation of sleeve 116. In turn, the magnitude of predetermined angle α is limited by the thickness T (FIG. 9) of spindle sleeve 116. Thickness T must be of a magnitude to prevent deformation during handling of sleeve 116, installation of the sleeve 116 upon the spindle 104, or operation of the vehicle as the loads are transmitted from the vehicle through the spindle 104, spindle sleeve 116, wheel bearings 170, 180, hub 102 and to the road surface RS (FIG. 1).

Returning to FIGS. 4 and 5, a bearing spacer 188 allows excess axial forces to transfer through spacer 188 rather than bearings 170 and 180 so as to "preset" the bearing load. Bearing spacer 188 is machined to exact dimensions and matched relative to the dimensions of hub 102 that define the spacing between inboard bearing 170 and outboard bearing 180. It should be understood, that while this embodiment incorporates a bearing spacer 188 for ease of installation and ensuring proper bearing preload, other embodiments may omit the spacer 188. Bearings 170 are positioned between outboard races 184 and 190 while bearings 180 are positioned between races 186 and 192.

Referring now to FIGS. 6 through 9, the thickness T of sleeve 116 as measured from inner surface $SR_1$ to outer surface $SR_2$ varies depending upon the azimuth location and longitudinal location along sleeve 116. As already described, these variations in thickness allow changes in wheel alignment based on rotation of sleeve 116 about spindle 104.

An inboard spindle sleeve bearing surface 204 is manufactured to a size that will receive a cone or inner race of the inboard bearing 180. An outboard spindle sleeve bearing surface 206 is manufactured to a size that will receive a cone or inner race of the outboard bearing 170.

A reduced diameter surface 208 between inboard bearing surface 204 and outboard bearing surface 206 having a diameter less than the inboard bearing surface 204 eases assembly of inboard bearing 180 onto spindle sleeve 116. In this embodiment, reduced diameter surface 208 transitions to inboard bearing surface 204 with a first angled chamfer 210. Reduced diameter surface 208 transitions to outboard bearing surface 206 with a second angled chamfer 212. Inboard bearing surface 204 and outboard bearing surface 206 have diameters in this exemplary embodiment that are identical. However, other embodiments may have the outboard bearing surface 206 smaller than the inboard bearing surface 204, such as found in TN/TQ series bearings or TR series bearings.

As shown in FIGS. 7 and 9, sleeve 116 has a seal surface 214 that, in this embodiment, has an appreciable larger diameter than inboard bearing surface 204. Other embodiments within the scope of the invention may have a seal surface 214 with a diameter equal to that of inboard bearing surface 204. In this embodiment, the inboard portion of sleeve inner surface $SR_1$ possesses a groove 216 in which a seal 218 (FIG. 4), such as an o-ring type seal, is placed to prevent leakage of lubricant from the inner part of the hub or from the ingress of contaminants.

FIG. 8 depicts an end view of sleeve 116 from outboard end 162. For this orientation, sleeve 116 in this embodiment is thinner at the top than at the bottom as a result of the relative positioning of the axis $AR_2$ relative to axis $AR_1$. Inner surface $SR_1$ can be observed along the top half of sleeve 116 from this view since the inner surface axis $AR_1$ is angled down and away from the point of view of the figure. In this embodiment, no appreciable toe angle is present. However, it can be appreciated that a variation in the circumferential position of angle α—or axis $AR_2$ relative to $AR_1$—would result in a change in the wheel alignment.

Referring now to FIGS. 3 and 13, assembly 100 includes a washer 132 that is positioned between axle nut 108 and outboard end 162 of sleeve 116. Washer 132 has an inboard side 154 and an outboard side 156. The inboard side 154 defines a recess 166 into which the outboard end 162 of sleeve 116 is removably received. A tab 138 extends radially inward from a radially inner surface 152 of washer 132 and is received into an axially-oriented groove 168 (FIGS. 6 and 9) on the outboard end of sleeve 116. As such, tab 138 and groove 168 provide means for fixing the circumferential orientation of washer 132 so as to prevent rotation of washer 132 relative to sleeve 116.

Accordingly, assembly 100 can be used to adjust the alignment of a wheel plane WP on a vehicle 60 (FIGS. 1 and 2). In one exemplary method, axle nut 108 is loosened so that sleeve 116 can be shifted in the outboard direction (O) away from flange 158. The amount of movement must be enough to allow for pin 160 to be disengaged and permit the rotation of sleeve 116 relative to spindle 104. Depending upon the amount of e.g., toe or camber correction desired and the direction (positive or negative) of the desired toe correction, sleeve 116 is rotated clockwise or counterclockwise as described above with regard to FIGS. 10, 11, and 12 so to select the desired matching pair of apertures. Once selected, sleeve 116 is shifted along the inboard direction (I) and pin 160 is reengaged with flange 158 (i.e. pin 160 is positioned within the matching pair of apertures selected) so as to prevent rotation of sleeve 116 relative so spindle 104. Axle nut 108 can then be tightened to secure assembly 100. Other exemplary methods of adjusting the circumferential position of sleeve 116 may be used as well.

As stated, the amount of rotation of sleeve 116 that is required to achieve a specific change in camber, toe, and thrust is controlled by e.g., the magnitude of angle α as well as the number and spacing of the first and second plurality of apertures on flange 158 and the inboard end 162 of sleeve 116. The radial distance between axis $AR_O$ and the center of each aperture also affects the amount of change in alignment that occurs when rotating sleeve 116 between matching pairs of apertures. As will now be further described, numerous arrangements of the matching pairs of apertures can be provided based on the range and magnitude of adjustability needed for an exemplary wheel alignment assembly of the present invention.

FIG. 14 depicts an exemplary flange 300 of an axle that is to be joined with the inboard end of a sleeve 400. For purposes of illustration, portions of the axle that support flange 300 as well as portions of sleeve 400 have been removed. As previously described, sleeve 400 is rotated about the axle's spindle to the desired position for wheel alignment. At least one of the first plurality of axially-oriented apertures 404 on sleeve 400 and at least one of the second plurality of axially-oriented apertures 304 of flange 300 are aligned at the desired position as a matching pair of apertures. A locking mechanism such as a pin is extended axially into the matching pair to prevent rotation of sleeve 400 relative to the axle and flange 300 as previously described.

In an exemplary method of the present invention, let $FP_{TOT}$ represent the total number of apertures chosen for the first plurality of apertures 404 on sleeve 400. For exemplary sleeve 400 in FIG. 14, $FP_{TOT}=8$. Similarly, let $SP_{TOT}$ represent the total number of apertures chosen for the second plurality of apertures 304 on flange 300. For exemplary flange 300 in FIG. 14, $FP_{TOT}=12$.

Notably, for this exemplary embodiment, apertures 304 and 404 are all at the same radial distance $R_D$ from axis $AR_O$ (which is identical to $AR_1$—the axis of the inner surface of revolution of the sleeve 400). As such, the maximum number of matching pairs of apertures that can be created at any single circumferential orientation of sleeve 400 relative to $AR_O$ is equal to the greatest common factor (GCF) of $FP_{TOT}$ and $SP_{TOT}$. For the exemplary flange 300 and sleeve 400 of FIG. 14, the GCF would be four.

More particularly, the maximum number of matching pairs of apertures 304 and 404 that can be created at any single circumferential orientation of sleeve 400 relative to $AR_O$ and flange 300 is four. Thus, four pins could be used to engage flange 300 and sleeve 400 in such position. At the same time, 24 unique positions can be created through rotation of sleeve 400 relative to flange 300. Indicia 302 and 402 can be used to meter the correct amount of relative rotation.

To ensure that only one matching pair exists between the first and second plurality of apertures on the sleeve and flange, respectively, $FP_{TOT}$ and $SP_{TOT}$ must be selected such that their GCF is the integer 1. Knowing that the values of $FP_{TOT}$ and $SP_{TOT}$ can be determined to create only a single matching pair of apertures at a time during the revolution of the sleeve is very useful in designing exemplary embodiments of a wheel alignment system of the present invention.

By way of example, referring to FIG. 15, a designer can choose the total number of the second plurality of apertures $SP_{TOT}$ of a flange 500 based on e.g., the number of positions of toe and camber adjustment desired for the assembly 100. Assume again the designer chooses a total number of 12 positions for $SP_{TOT}$. Accordingly, 12 apertures are positioned uniformly apart from each other along the circumferential direction C with each at a predetermined radial distance $R_O$ relative to $AR_O$.

In order to provide only one matching pair of apertures at a time as sleeve 600 is rotated relative to flange 500, the total number of the first plurality of apertures $FP_{TOT}$ of sleeve 600 must be selected so that the GCF of $FP_{TOT}$ and $SP_{TOT}$ is the integer 1. For the example of FIG. 15, such occurs when $FP_{TOT}$ is equal to 7. Accordingly, while there are 84 (the product of 12 and 7) unique matching pairs of apertures created by the rotation of sleeve 600 relative to flange 500, only one matching pair at any one time can be aligned (i.e. indexed) along the axial direction. Stated differently, only one pin or other locking mechanism can be extended between flange 500 and sleeve 600 at any one time as sleeve 600 is rotated about the circumferential direction relative to flange 500. Indicia 502 and 602 can be used to meter the correct amount of relative rotation.

As will be understood using the teachings disclosed herein, the positive integer values that can be used for $FP_{TOT}$ and $SP_{TOT}$ can be varied substantially to provide a wide range of adjustability of the sleeve and flange. For example, the number of apertures for $FP_{TOT}$, $SP_{TOT}$, or both, can be varied to determine the number of indexed positions that are available. If the GCF is the integer 1, then a single matching pair of aligned apertures at any one time can be ensured for rotations of the sleeve.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for indexing a wheel alignment system for a vehicle, the wheel alignment system including an axle defining axial, radial, and circumferential directions, the axle comprising a flange and a spindle onto which a sleeve is rotatably received, the axle having an outer surface of revolution about an axis $AR_O$, the method comprising the steps of:

choosing a total number $FP_{TOT}$ of a first plurality of axially-oriented apertures for positioning on the sleeve;

positioning the first plurality of apertures on the sleeve at locations uniformly apart from each other along the circumferential direction with each at a predetermined radial distance from axis $AR_O$;

selecting a total number $SP_{TOT}$ of a second plurality of axially-oriented apertures for positioning on the flange, wherein $SP_{TOT}$ and $FP_{TOT}$ do not share any common factors other than integer 1; and positioning the second plurality of apertures on the flange at locations uniformly apart from each other along the circumferential direction and at the predetermined radial distance from axis $AR_O$;

wherein the first and second plurality of apertures provide a plurality of matching pairs of apertures that can be aligned along the axial direction by rotation of the sleeve to provide changes in wheel alignment.

2. The method for indexing a wheel alignment system for a vehicle as in claim 1, wherein rotation of the sleeve about the spindle aligns only one matching pair of apertures at a time.

3. The method for indexing a wheel alignment system for a vehicle as in claim 1, further comprising the step of locking the circumferential position of the sleeve relative the spindle.

4. The method for indexing a wheel alignment system for a vehicle as in claim 1, wherein the step of locking comprises extending a pin between the matching pair of apertures.

5. The method for indexing a wheel alignment system for a vehicle as in claim 1, wherein the step of choosing a total number $SP_{TOT}$ of a second plurality of axially-oriented apertures comprises determining an amount of change in toe and camber of the wheel alignment to be achieved by rotating the sleeve between matching pairs of apertures.

6. The method for indexing a wheel alignment system for a vehicle as in claim 1, wherein the sleeve has an inner surface of revolution about a first axis $AR_1$ and an outer surface of revolution about a second axis $AR_2$, wherein the first axis $AR_1$ and the second axis $AR_2$ are at a non-zero angle $\alpha$ from each other, and wherein the sleeve defines an interior into which the spindle is releasably received.

7. The method for indexing a wheel alignment system for a vehicle as in claim 6, wherein angle $\alpha$ is in the range of $0.1° \leq \alpha \leq 0.7°$.

8. The method allowing selective adjustment of wheel alignment on a vehicle as in claim 7, wherein angle $\alpha$ is about 0.3°.

9. An assembly allowing selective adjustment of wheel alignment on a vehicle, comprising:

an axle defining axial, radial, and circumferential directions, the axle comprising a flange and a spindle having an outboard end and an inboard end;

a first plurality of apertures positioned at an inboard end of a sleeve and extending along the axial direction, the first plurality of apertures spaced apart along the circumferential direction and positioned at varying radial distances from a first axis, wherein the total number of the first plurality of apertures is $FP_{TOT}$;

a second plurality of apertures positioned on the flange near an inboard end of the spindle and extending along an axial direction, the second plurality of apertures spaced apart along the circumferential direction and positioned at varying radial distances from the first axis, wherein the total number of the first plurality of apertures is $SP_{TOT}$, and wherein $SP_{TOT}$ and $FP_{TOT}$ do not share any common factors other than integer 1;

wherein the first and second plurality of apertures provide a plurality of matching pairs of apertures that can be aligned along the axial direction by rotation of the sleeve to provide changes in wheel alignment; and a removable lock extending between the apertures of one of the matching pairs of apertures so as to prevent the rotation of the sleeve relative to the spindle.

10. The assembly allowing selective adjustment of wheel alignment on a vehicle as in claim 9, wherein the removable lock comprises a pin extending along the axial direction between the apertures of one of the matching pairs of apertures so as to prevent the rotation of the sleeve relative to the spindle.

11. The assembly allowing selective adjustment of wheel alignment on a vehicle as in claim 9, further comprising:

a washer positioned along the outboard end of the spindle adjacent to the sleeve; and means for fixing the circumferential orientation of the washer so as to prevent rotation of the washer relative to the sleeve.

12. The assembly allowing selective adjustment of wheel alignment on a vehicle as in claim 11, wherein means for fixing the circumferential orientation of the washer so as to prevent rotation of the washer relative to the spindle comprises:

a groove positioned along the outboard end of the sleeve on the outer surface of revolution; and a tab extending radially inward from the washer and received into the groove of the sleeve.

13. The assembly allowing selective adjustment of wheel alignment on a vehicle as in claim 12, wherein the washer includes an inboard side defining recess into which the outboard end of the sleeve is received, and wherein the tab extends into the recess.

14. The assembly allowing selective adjustment of wheel alignment on a vehicle as in claim 13, wherein the washer includes an inboard side defining a recess into which the outboard end of the sleeve is received.

15. The assembly allowing selective adjustment of wheel alignment on a vehicle as in claim 13, wherein the washer includes an outboard side, and wherein the assembly further comprising an axle nut positioned adjacent to the washer in contact with the outboard side of the washer.

16. The assembly allowing selective adjustment of wheel alignment on a vehicle as in claim 9, wherein angle $\alpha$ is in the range of $0.1° \leq \alpha \leq 0.7°$.

17. The assembly allowing selective adjustment of wheel alignment on a vehicle as in claim 16, wherein angle $\alpha$ is about $0.3°$.

18. The assembly allowing selective adjustment of wheel alignment on a vehicle as in claim 9, wherein the sleeve has a thickness that varies along an axial direction of the spindle.

19. The assembly allowing selective adjustment of wheel alignment on a vehicle as in claim 9, wherein the first plurality of apertures are positioned symmetrically about a central aperture of the first plurality of apertures; and the second plurality of apertures are positioned symmetrically about a central aperture of the second plurality of apertures.

\* \* \* \* \*